United States Patent

Barnett

[19]

[11] Patent Number: 6,068,184
[45] Date of Patent: May 30, 2000

[54] SECURITY CARD AND SYSTEM FOR USE THEREOF

[76] Inventor: Donald A. Barnett, 600 Decatur Rd., Jacksonville, N.C. 28540

[21] Appl. No.: 09/067,130

[22] Filed: Apr. 27, 1998

[51] Int. Cl.[7] ..................................................... G06K 5/00
[52] U.S. Cl. ........................................... 235/379; 235/380
[58] Field of Search .................................... 235/380, 381, 235/379, 382, 382.5, 449, 492, 454, 493, 487; 902/4, 5, 27; 340/825.33, 825.35, 825.34, 825.36; 705/44

[56] References Cited

U.S. PATENT DOCUMENTS 4,375,032 2/1983 Vchida .
5,354,974 10/1994 Eisenberg .
5,432,329 7/1995 O'Boyle et al. .

Primary Examiner—K. P. Hantis
Attorney, Agent, or Firm—Lynn E. Barber

[57] ABSTRACT

A security card system that includes a security card having an appearance like a real credit card or other bank card, and a security network that contains a security firm that enrolls persons in the system who have been provided with a security card by a card-issuing institution, and uses the security network for responding to emergency calls initiated by use of the security card, reports fraud, and in general, implements an emergency system and acts as a theft deterrent.

11 Claims, 5 Drawing Sheets

SECURITY CARD AND SYSTEM FOR USE THEREOF

BACKGROUND OF THE INVENTION

1. Field of the Invention

This invention relates to a security card and system for reducing credit card fraud.

2. Description of the Related Art

Credit-card fraud is an increasingly large problem. Stolen or misplaced credit cards are frequently misused. Standard credit cards, bank cards (debit cards) and stored value cards are memory cards with a magnetic stripe affixed to the surface or have a chip built into the card, and are inexpensive and easy to produce. All of these cards can be used at automated teller machine (ATMs) to make transactions between accounts or make cash withdrawals/advances or to make purchases at a given point of sale (POS). Standard credit cards that are used to charge purchases can often be used by consumers over the telephone or in a written purchase without actually presenting the card, but most in-person credit purchases and ATM uses require possession and use of the actual card, and in the case of an ATM in the United States and in all cases in the United Kingdom, possession and use of the correct personal identification number (PIN), which enables access to cash at automated teller machines (ATMs) located in millions of locations around the world.

When credit cards are used at an ATM, the credit card owner runs the credit card through the ATM card reader for identification and authentication of the account to be accessed. The information contained on the magnetic stripe or chip is minimal, often only a name, social security number, account number and address. What the card reader is looking for is the encoded key for authentication purposes. When the card is read, a message goes to the host (for example, Visa, MasterCard, etc.) for authentication. Once the host has the encrypted code it sends a challenge to the user (ATM). The correct response to the challenge is the PIN associated with the account that the person is trying to access. Both the initial transmission of the encoded key (PIN) that is to open the account and the challenge and response messages are hidden deep within the encrypted code that consists of an algorithm. If the user does not know the correct PIN for the card associated with the account the user is trying to access, often the system will allow more than one attempt at entering the correct PIN. Once the preset limit of incorrect PIN entries is met, the card is "captured" by the ATM and not returned to the user. This process is an "on-line" transaction, meaning that the card is being authenticated in real time before the transaction can be completed.

When credit cards are used at a store that is on-line, the process is exactly the same if a PIN number is used to authenticate the transaction. Many points of sale, however, do not require the individual presenting the card to enter a PIN number when making a purchase, thereby completing the transaction on faith that the individual presenting the credit card is actually the owner of the credit card and the account associated with the card. At a POS, often cards are read to see if the card has credit/value remaining and not for authentication. If the card has been reported stolen, and is on the system, it is at this point that the card reader can inform the POS of the status of the card. It is now the responsibility of the POS to either retain the card or allow an illegal transaction.

When credit cards are used at a small shop that is not on-line, but which later uploads the information from a reader from the off-line site, the POS has taken all transactions on faith that cards used to purchase goods or services did in fact belong to the individuals presenting the card and that the card did in fact have credit/value remaining to cover the cost of the transaction. Only after uploading all transactions at the end of the day or week or other time interval, will the POS discover which cards were legitimate and which were beyond their limit or were stolen.

In addition to the straightforward theft of credit cards themselves, thieves often steal PINs. Through "shoulder-surfing" (looking over the shoulder of a credit card user at an ATM), video surveillance by unauthorized cameras positioned within viewing distance of ATMs, and strong-arm robbery by persons seeking access to the account of a card-holder and through sharing of PINs and by card-owners carrying cards and PINs together, and through other means, the current credit card system is easily corrupted. Consumers are often desperately afraid to go to an ATM site because of the high likelihood of robbery during the time period of their approach to, utilization of, and departure from, an ATM site.

Through lack of knowledge or through carelessness, consumers often unwittingly assist the thieves by their behavior at the ATM or by their time of use of the ATM. Some consumers even write their PIN on the back of their credit cards so that they can remember it, but of course the number is then easily available to any thief. Any type of system that depends on a password or secret number depends on the ability to keep the secret information a secret.

Other thieves install bogus ATM machines that are simply computer terminals whereby people are induced to enter their credit card numbers, thereby providing a copy of all information contained on the card and the PIN not knowing that they are not using a real ATM but are using an inauthentic host. With that knowledge, credit card thieves who know the PIN can make multiple copies of the credit/debit card and access the funds from numerous locations, confounding the authorities' efforts to stop the crime.

There have been many efforts to try to reduce the amount of credit/debit card-related theft because this theft harms both the credit companies, and the legitimate credit card owners, who must pay more for the privilege of having a credit card to help offset the amount stolen each year. One basic step is to educate consumers so that all information about their credit/debit cards is kept secure.

There are a number of current technologies to try to solve these problems, which, although often clever, do not stand up to the "strong-arm tactics" of thieves. For example, solutions involving cryptography have been developed for user authentication. Such systems authenticate a user based on the knowledge or possession of a cryptographic key. Such systems require the user to have access to or to have memorized a key to be able to access a particular system, but there is no method provided to keep unauthorized users from obtaining the key by subterfuge or force.

Criminals desiring to utilize credit/debit cards for which there are hand-held password generators that require the use of a PIN, can, through might or cunning, obtain the PIN from the legitimate consumer along with the password generator itself, and thus, the cash. These devices have the inconvenience of requiring the consumer to carry the generator and to memorize the PIN, or to risk carrying the written PIN with them.

Another example of a current technology which can be very unsafe is "biometrics" in which the legitimate credit card user is recognized by a biological characteristic, for example, fingerprints, finger measurement, retinal/iris scan, or voice recognition. In each case, the serious criminal can subvert the system and/or there are serious drawbacks to use of the system. In the ease of fingerprints, the finger which is scanned by the duped ATM can be the finger of a coerced credit-card owner, or a dead credit-card owner. Many consumers are also reluctant to be finger-printed, fearing that the information will go into a police file somewhere. In the case of finger measurements, a frozen finger measures the same as a live finger. In the case of retinal scans, consumers are afraid of retinal scanner malfunction and resultant damage to the eye. Voice recognition equipment has advanced to the point where an individual's voice can be correctly identified under several different circumstances, even under extreme stress or duress. The problem with voice recognition is the same with all biometric authentication, which is that the user can be coerced into using parts or characteristics of the user's body to access secured areas, whether they be personal accounts or bank vaults.

Other systems designed to meet this problem include THE PANIC BUTTON™ made by Statsignal Systems, which consists of a radio transmitter contained in a hand-held key fob, which is essentially designed as a personal security system rather than to prevent credit card problems. In this system, there is a receiver inside the ATM facility and a modem connected to the 911 emergency response telephone network. Information on the owner's name, address, make of car and location from which the alarm is sounded is passed to the police. This system takes 18–20 seconds to identify the caller and then calls the 911 number. There is no guarantee that the call will go through, nor is there an estimated response time. The cost is about $500 for a bank to install and about $5 per month for the consumer.

There also are systems for removing one or more portions of the credit card so that the card-owner is not carrying an intact, usable card, but must assemble the completed card to use it. From the very high-tech VAULT CARD™ by Card-Logix which allows the owner to unlock the card by entering a PIN via buttons on the card itself, to the very low-tech PINCard™ by Affinity Actions Ltd. that is nothing more than a grid-type encrypting system that utilizes a paper grid and a clear plastic overlay that when properly aligned decodes the blackened-in squares that correspond to a PIN, every attempt at securing a credit/debit card thus far still relies on the memorization of a PIN or alphanumeric code to keep either the card or the PIN itself secure.

"Smart cards" are the next step in credit/debit/stored value card evolution. They employ a microchip in conjunction with or in place of a magnetic stripe. Because the chip is a microprocessor, it has much greater capacity for the storage of information and is able to make computations that a magnetic strip cannot make. Smart chip/card technology is advancing every day, making the cards able to store more and more information about the user, such as the accounts the user owns, the types of purchases and their frequency. It is the desire of smart card makers to do away with magnetic stripe technology. The problem is that the existing infrastructure is not designed to support the new and changing technology. The card readers of today cannot support a smart chip. A smart chip only needs only to have power applied to it to turn it into the functioning microprocessor that it is. When the card is powered, it is capable of authenticating a user without going to a host in the way a magnetic stripe-based technology does. The smart card essentially determines whether or not a transaction will be allowed to take place. This, however, is its greatest flaw, because now, not only is one source of cash/value accessible, but all functions of the card are able to be utilized or exploited. Even with the increased functionality of smart chip technology, there is still need to for an access key. Again, smart card makers are looking to existing technologies such as cryptology and biometrics to provide the solutions for reducing fraudulent transactions. While these cards are far superior to conventional magnetic stripe-based cards, the common denominator is still the user/abuser. These cards do not have any mechanism for keeping an unauthorized user from forcing the authorized user to use the card, and do not have any mechanism of notifying authorities of unauthorized use or attempts at use.

It is therefore an object of the invention to provide a security card system which builds on existing technology to work actively against fraud and misuse of credit/debit cards, and arms the consumer with the proper tools to be proactive in the prevention of fraud, theft and violence.

It is a further object of the invention to provide a security card system which can be used to serve as a PIN memory aid, an emergency call activator, and a financial access padlock, and can thus give the consumer increased peace of mind.

It is a further object of the invention to provide a security card system which decreases the success rate of the would-be thief who is trying to determine the credit/debit/stored value card owner's PIN.

Other objects and advantages will be more fully apparent from the following disclosure and appended claims.

SUMMARY OF THE INVENTION

The invention herein is for a security card system comprising a security card, and a security network containing a security firm that enrolls persons in the system who have been provided with a security card by a card-issuing institution, and uses the security network for responding to emergency calls initiated by use of the security card, reports fraud, and in general, implements an emergency system and acts as a theft deterrent.

Other objects and features of the inventions will be more fully apparent from the following disclosure and appended claims.

DETAILED DESCRIPTION OF THE INVENTION AND PREFERRED EMBODIMENTS THEREOF

The present invention provides a security card system that includes a security card and a security network. The primary component of the security card system is the security card, which has an external appearance that is essentially identical to the external appearance of "real" credit cards or other bank cards, because it has many, if not all, of the external features found in the real cards, in addition to being readable in card machines used for real credit cards. As will be made more clear herein, the security card of the invention is not usable as a credit card, that is, to obtain money or credit, and is not meant for such a use.

As used herein, the term "bank card" or "credit card" or "credit/debit card" includes any generally rectangular, generally plastic, card, such as a debit, credit or cash value card, that is used to obtain credit or cash or cash value by a user at a POS or ATM or other transactional location and is generally issued by banks and other financial institutions. Included within such card terminology herein are also "contactless" cards, for example, cards that do not need to be scanned in the conventional sense of the word, but only need to be in close proximity to a reader to have information evaluated. Such contactless cards include cards used in subways, for toll payment, for admission to concerts, or any other place where there is a high volume in a short time period. The card scanner or reader, whatever type of card is used, must be connected the security card system via the CPU in order for the trigger code to be detected and the system activated as discussed in more detail below.

The term "POS/ATM" refers to any place a bank card might be used. As used herein a "card machine" refers to any machine, such as an ATM, POS card-scanner or reader, and the like which is capable of handling a bank card to charge a consumer, or credit or debit a financial account or any other function controlled by or accessed by such cards. The term "security card" refers to the card of the invention herein and "security firm' refers to the company(ies) that enroll owners who have been issued a security card, and respond to the alarm resulting from use of the security card in any card machine connected to the system of the invention as described herein.

Figure 1:
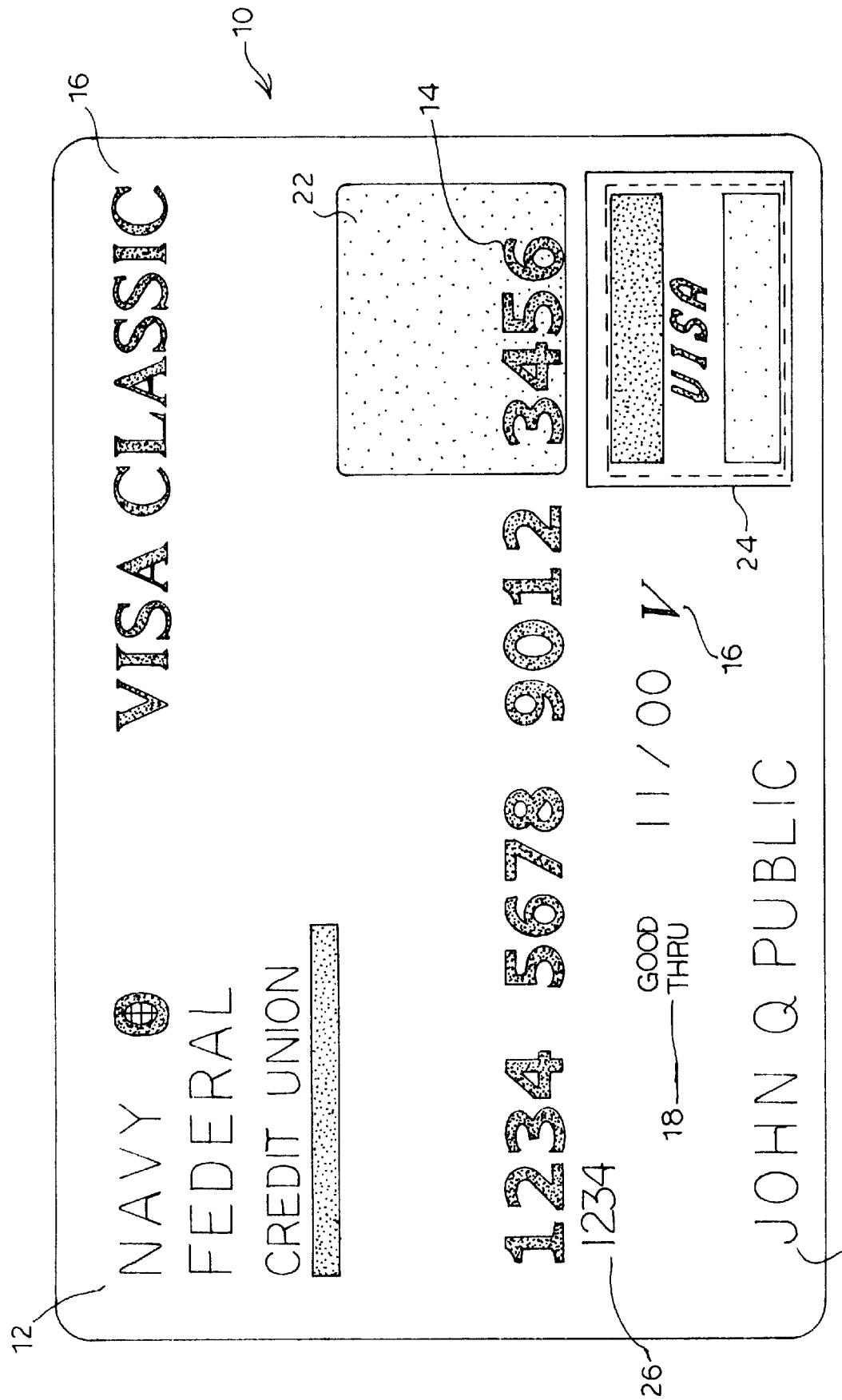
FIG. 1 is a plan view of the upper surface of a security card of the invention.
Figure 2:
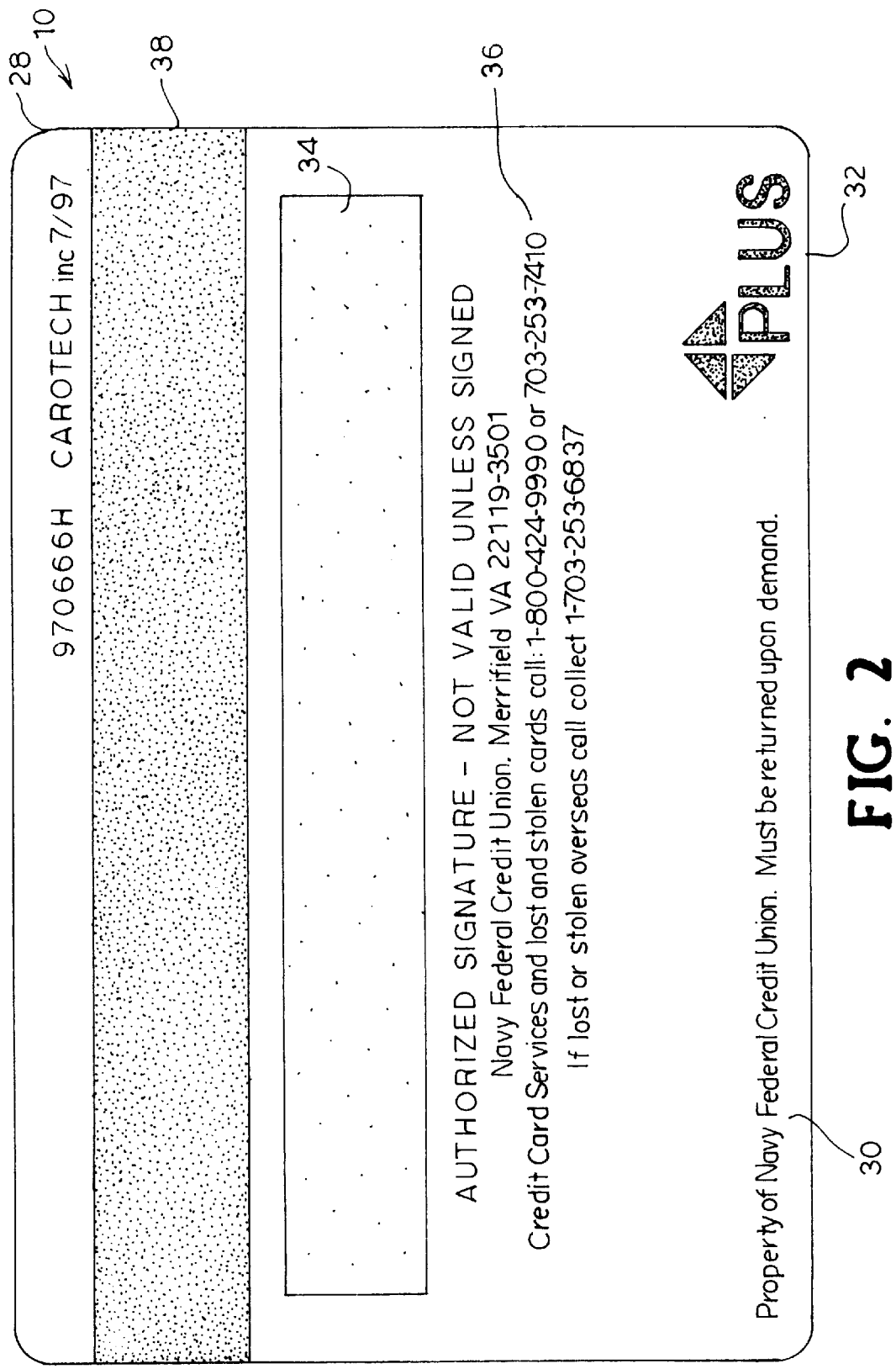
FIG. 2 is a plan view of the lower surface of a security card of the invention which has a magnetic stripe.

Referring now to the figures in more detail, the security card 10 shown in FIG. 1 has all of the normal external, visible characteristics of a real bank card, including shape, size, and material of construction. The security card shown as an example in FIGS. 1 and 2 is made to be as closely identical in appearance to a particular VISA™, magnetic stripe card. The external appearance of the security card of the invention can be made to be as closely identical in appearance as possible to any chosen bank card, including, for example, those with smart chips, or other visible features, and of any bank or financial institution, and any credit card company, as well as to contactless cards discussed above.

Thus, the front of a typical security card 10 shown in FIG. 1, like a typical credit card, for example, a VISA™ card, has a bank logo or name 12, a sequence of four 4-digit numbers 14 which are raised above the surface of the card type 16, the expiration date 18, the card-holder's name 20, one or more holograms 22, the credit card company's logo 24 (e.g. VISA™), and the bank identification number 26. It may also have an indication of when the cardholder first became a cardholder or other information or design features (not shown).

On the reverse side of a typical such card (both a typical credit card and therefore, the corresponding security card of the invention) as shown in FIG. 2, miscellaneous card or bank information 28, another bank name indication 30, other logo(s) such as that of the card operating system 32, a tape strip 34 to be signed by the card-holder, and recessed information from the front side of the card (not shown), the telephone number(s) 36 to call for information or to report lost or stolen cards, and a visible area 38 which indicates the location of encoded algorithms and the like, such as a magnetic stripe or strip and/or smart chip as discussed above. Any other information, coloration and markings that are found on real credit cards are also found on the security card so that the security card has exactly the same appearance as the "real" bank card that it is meant to imitate.

With respect to the four 4-digit numbers on the front side of the security card, these numbers may be assigned by the card issuer, but preferably are chosen by the card purchaser. Thus, in the preferred embodiment, to obtain a security card, the consumer provides four 4-digit numbers to go on the security card (or three 4-digit numbers where the bank identification number (BIN) is required to be the first 4-digit number; the BIN connects the seller to the account of the card owner at the correct financial institution). Each of these 4-digit numbers can be random numbers, or in the preferred embodiment of the invention, are the consumer's PINs for three of the consumer's "real" credit cards. In a preferred embodiment of the invention, at least one of the series of four digit numbers on the security card of the invention, instead of being part of a random number, is the PIN for the credit card owner's "real credit card(s). Because essentially all real credit cards also have four 4-digit numbers and because the security card of the invention otherwise looks like a real credit card, someone looking at the security card of the invention and the consumer's other real credit cards does not know whether a particular card is a real card with a real bank card number, or is a security card having PINs or random or bank-generated numbers.

In addition, the magnetic strip or smart chip on the security card has a program that looks in every way to be authentic when the security card is inserted into a card machine. The security card has a false history and stored value that is displayed by the card reader. Cryptographic algorithms, the same as those employed on real credit cards, are used on the security cards of the invention, except in the preferred embodiment of the invention herein, code is added to the algorithms to enable use of the security card to disable an inauthentic host (a computer terminal masquerading as an ATM). An inauthentic host, comprising essentially a card reader and a computer, such as a lap top, will not have the necessary algorithms to complete the challenge and response sequence of a true host, unless someone with top secret information is using that information illegally. When the security card is read by an inauthentic host, it will automatically load a destructive virus that will be activated when the host is unable to correctly respond to the security card's challenge, thereby destroying all of the illegally gained information. True hosts will be privy to the challenge of the security card and will be immune to the destructive virus. If a security card of the invention is read by a POS/ATM that is not part of the system of the invention, the information on the card is transmitted to the host. So long as one person from the host's organization were carrying the security card, then the host would be on the system and would be privy to the trigger code and therefore immune to the virus. Ultimately, it would be to all legitimate hosts' advantage to be on the system, because as is the common practice, most people do not limit themselves to using the ATM system that belongs to their financial institution.

It is important to note that "cash value" or "stored value" cards of the future may not have any numbers on the front to identify them as belonging to an account, because they themselves are the account. They are an "electronic purse" capable of storing value, having value removed or paid out, and reloading value. For these types of cards, the security card of the invention will not be a memory aid to PINS, but rather it will only play the roles of theft deterrent, financial access padlock and emergency call beacon. For such applications, such as at home banking via the Internet, security cards of the invention that mimic "cash value" or "stored value" cards are the ideal security system. In this application of the card, the home computer serves in the role of card reader/scanner via the Internet connection to the host which is where the security system CPU is co-located. Instead of the CPU sending the host location as the point of activation, it then would report the Internet address from where the transaction originated, e.g., abcdefg@aol.com. Given the numerous Internet service providers in multiple domains, it will be more difficult to apprehend a would-be thief on the Internet; however, the security card has still served its purpose by shutting down financial access to the card holder's accounts. Not only can a thief spend the value stored on a stolen card, but the thief can also continue to reload value from the owner's account via a personal computer over the Internet if the thief has the PIN which allows for that transaction and is not using a security card of the invention. When the thief uses the security card, the alarm, response and apprehension features of the invention which are discussed in more detail below are initiated.

In addition to "cash value" or "stored value" cards it is equally important to make mention of cards such as membership cards, corporate gasoline charge cards, student identification cards, and loyalty cards, all of which now feature either a magnetic stripe and/or smart chip. Essentially any card that is carried in a wallet or purse by anyone can serve in the role of a security card, whether it be to summons help or place a padlock on financial access.

Also, there is an encrypted trigger code on each security card of the invention herein which preferably changes every twelve months so that there is a reduced opportunity for someone to have time to determine the code by reverse engineering or other means. For security cards expiring in two years from a given date, there are thus preferably three trigger codes, one trigger code for the first partial year until the current calendar year ends (for example, for a security card beginning on Sep. 1, 1997, from Sep. 1, 1997 until Dec. 31, 1997), one trigger code for the full calendar year of the security card (all of 1998 in the same example), and one trigger code for the time between the end of the fall calendar year of the card and the expiration date (Jan. 1, 1999 to Aug. 31, 1999 in the example). This allows the credit card to be issued at any time during the cycle of the active code. Because the odds of anyone being able to break the algorithm's code in a lifetime are estimated to be one in a trillion, would-be hackers are deterred from trying to break the code. Having more than one code also provides a means for changing the active code should an individual privy to classified information somehow compromise the system.

Figure 5:
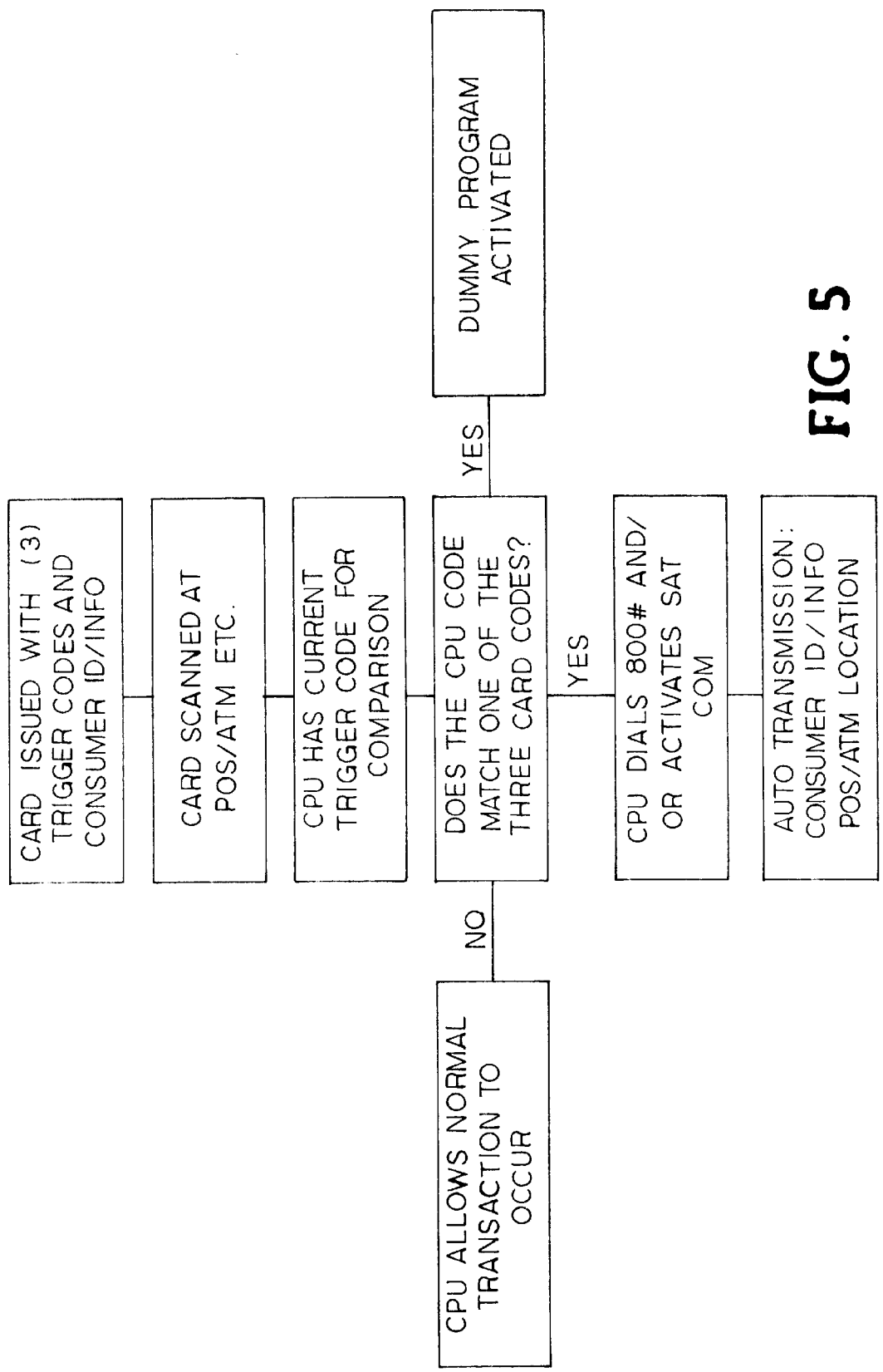
FIG. 5 is a flow chart schematically showing how the system of the invention may be programmed.

FIG. 5 shows schematically more detail on the computer operation in the system of the invention. Thus, in the preferred embodiment, the security card is issued to a consumer with three trigger codes embedded deep within coded algorithms. In addition to codes that "activate" the system, the consumer's ID code/number and other information is also embedded with algorithms to protect that information (completely separate from the codes that act as triggers). When a card is scanned into the system within its lifespan, the CPU has within it an active trigger code, and may also have multiple fake trigger codes to deter hacking. The computer matches the card code and the code it knows to be the real trigger code, and if there is a match the security system is activated. Activation of the system means that a "dummy" program plays its interactive video for the would-be thief, while in the background, a preprogrammed chain of events takes place. If a real credit/debit card is scanned, the CPU does nothing to activate the security system, and the transaction occurs as it normally would. The programming of the system itself is preferably designed, as is known in the art, to work with many platforms and many computer languages, so that it may be as widely disseminated as possible.

Real cards have certain strengths and weaknesses in regard to the questions of cloning and identity assumption which are preferably mimicked by the security card of the invention. Thus, the security card of the invention can be copied or cloned in the same manner as a real credit card. This means that someone who has stolen the security card can make additional copies of it, without realizing that the cards are not real bank cards, and increase the likelihood that the security card or a copy of it will be used by the thief or his collaborators in a card machine, and initiate the emergency system. Once a consumer has secured his/her financial holdings via a separate account, the stolen card can serve to track and hopefully apprehend the thief.

Consumers who obtain a security card need not have any "real" credit cards to receive the benefits of the invention. The security card of the invention can still be used, as discussed herein, as a distress beacon from any on-line activity, and can aid in the retrieval of stolen goods and the apprehension of assailants.

The consumer receiving a security card is educated on the safe use of credit cards, enrolled in the security card program so that use of the security card will trigger the security system. The consumer is assigned an identification number, which is known only to the financial institution and the security firm, and is then issued the security card. Optionally, the consumer can be photographed and additional information obtained from the consumer to help solve a future crime once the security system is triggered by the use of the security card.

If the security card of the invention is placed in a reader that is on-line or is uploaded from an off-line site, it initiates an emergency trigger program, comprising an alarm system and preferably, subsequent response and apprehension procedures. When the security card of the invention is used by someone, whether it be by a thief, or intentionally or by mistake by the legitimate owner of the security card, at a point of sale (POS), at an ATM, or any other "bank machine" where bank cards are accepted, the emergency trigger program is first triggered by the insertion of the security card of the invention in the credit card scanner. The person using the security card, however, cannot tell that anything is wrong when the security card information enters the machine. As discussed above, a "dummy" program runs an interactive display on the terminal, which appears to an observer to be the same as when a real credit card is used, while the true but hidden program triggered by use of the security card has already set the remote alarm, and a subsequent, essentially immediate response and apprehension process in motion.

While appearing identical to the program triggered by a normal credit card transaction, the dummy program preferably has a built-in time delay that increases the normal transaction time, for example, by one-half to three-quarters over the normal transaction time, allowing more time for the authorities to arrive. Use of any PIN with the security card of the invention preferably is accepted the first time, and the machine returns the card to whoever used it. This is important in increasing the likelihood of catching the thief, who is likely to take the card and to try to use it again somewhere, thus again activating the system.

Figure 3:
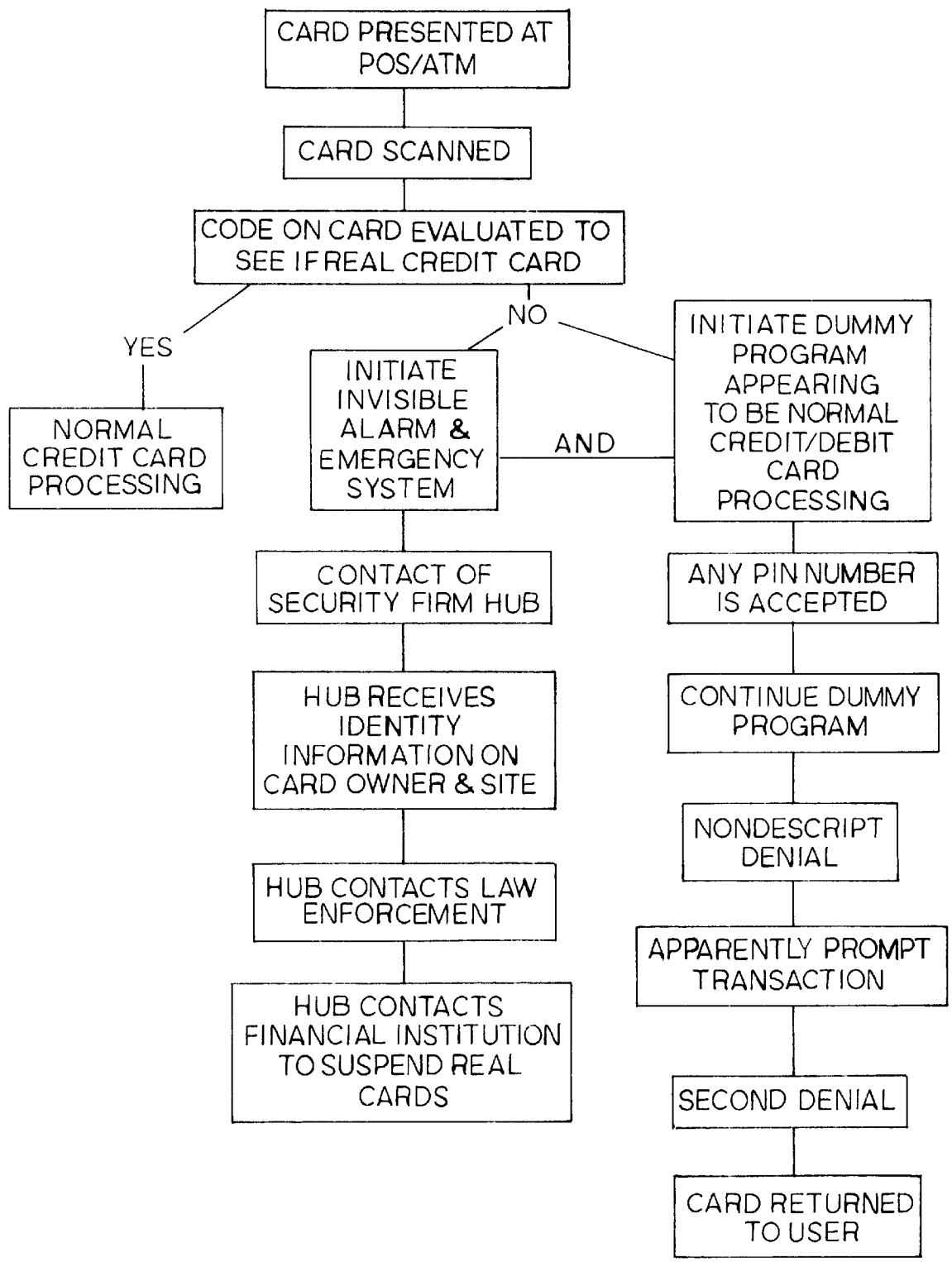
FIG. 3 is flow chart showing how the security system works when a security card is used.

The security card by design is a "hot list", meaning that whenever it is used the emergency system is activated. The events which occur when the security card of the invention is used are set forth in FIG. 3 (when the POS/ATM CPU determines that the card that has been inserted is not a real card but a security card).

In the event a consumer is confronted at a location such as an ATM, it is possible for the card to benefit the consumer in one of two ways. First, if the encounter is anticipated in time to use the security card, the consumer pretends to use the security card as a real card to complete a cash withdrawal or other appropriate transaction. The consumer appears to cooperate with someone who is forcing the consumer to use a card to withdraw funds by entering in any PIN and asks for the demanded amount of money. When the machine gives a nondescript reason for denial of funds a first time (and possibly, one or more additional times), the consumer cannot be blamed for noncompliance with the demand. In actuality, the mere fact that the card has been inserted into the ATM or other machine has actuated the emergency system.

At the time of activation, the POS/ATM CPU sends the identification number of the card-owner, and preferably a real-time video feed from the site via the existing surveillance camera(s) and real time audio feed enabling the user, although unwittingly, to give even greater detailed information to the security firm dispatcher to aid in apprehending the assailant, i.e., the assailant's voice can be recorded at the scene of the crime, and, through voice recognition, this recording may biometrically later help identify a suspect as the assailant. On the screen at the security firm's center appears personal information about the cardholder, the location where the card was used, a photo of the card-owner (if provided by the card-owner at the time of enrollment) and a picture of what is happening in real time at the scene where the card was used if the real time video feed is available at that site.

The second way a consumer can be benefited by the security card is to summons help after the fact. Thus, after a robber has made a getaway, the consumer can use the security card to start the communication about what has happened. Thus, the security card system of the invention can also be used as a distress beacon from any on-line activity. Use by anyone of the security card of the invention can assist the authorities in retrieving stolen goods and apprehending thieves and assailants.

In addition to the security firm notifying the local law-enforcement authorities when the security card is used, the card-owner's real cards are immediately suspended until the card-owner can be identified as the one tripping the alarm if that is the case.

Both a preferably newly created security firm and any existing financial institution that issues bank cards are part of the security system of the invention. The security card of the invention is preferably issued to the consumer by a financial institution, as is the case with real credit cards. The financial institution that issues the security card of the invention retains information on what "real" cards the consumers has, as in the prior system for standard billing and accounting purposes. The consumer picks a participating card that the consumer preferably does not presently carry, for example, VISA™ or MASTERCARD™, whether it be a debit, credit or cash value card, brand and a participating issuer financial institution, to start the process of obtaining a security card according to the invention.

In part of the preferred security card system of the invention, the security firm is responsible for enrolling consumers in the program, monitoring of the security card, responding to emergency calls, and reporting fraud to the financial institutions which issued the card. The security company retains information on the consumer, including identity, date of birth, and permanent address for use in assisting local authorities with the verification of the user's identity. If the user is the owner of the card, it is far more likely that the card is being used to summon help. Real time video feed from the site of usage can also help security firm operators target suspects for the local authorities and aid in apprehension.

To ensure the security of the "real" accounts, the consumer who obtains a security card is known only to both the security company and the financial institution as an assigned identification number, which is unknown to the consumer, and cannot thus be revealed by the consumer either inadvertently or by being forced by a thief.

Figure 4:
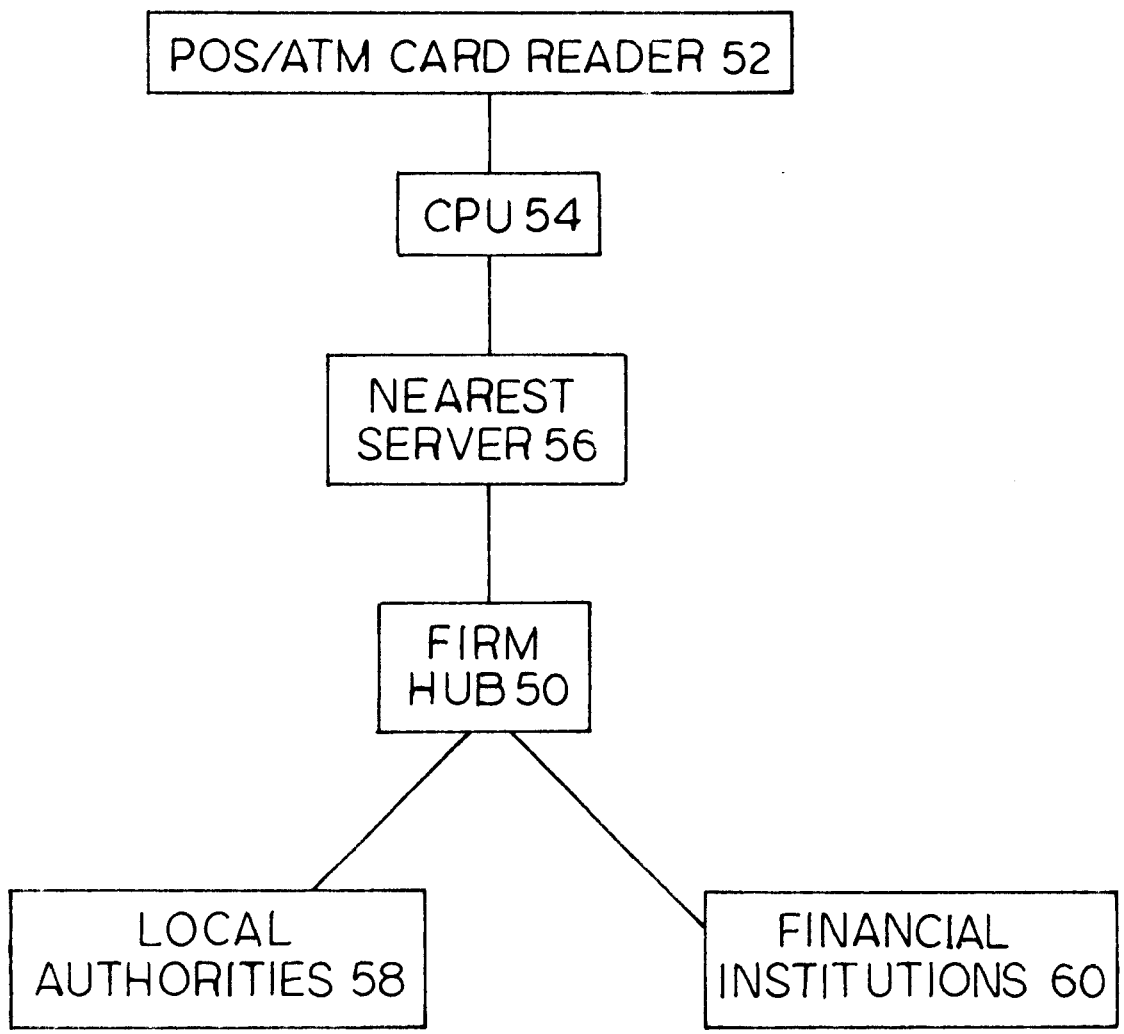
FIG. 4 is a schematic diagram of the system security network for processing use of the security card of the invention.

The system for processing the use of the security card preferably has the following components as shown schematically in FIG. 4. The system includes an intranet that is part of the security company, having a centrally located hub 50 and regionally located clusters of mirrored (identical backup system) computer processing units (CPUs). The flow of information in the system, once the security card is used at a POS/ATM is from the POS/ATM card reader 52 (home computer in the case of cards used over the Internet for home banking) to the CPU 54 (co-located with the host as used in the Internet home banking example), which determines if the card is a "real" card or not, to the nearest server 56 if it is a security card that was used, to the firm hub 50. From the firm hub 50, the local authorities 58 are contacted, as are the financial institutions 60 which have issued real bank cards to the owner of the security card. Due to the speed of network transmission, the approximate time from the scan of the security card at a POS or ATM 52 to display of information on the screen of a dispatcher in the security firm who in turn immediately contacts the closest law enforcement agency 58 to the point of origin is in the range of about 10 seconds. It is the duty of the security firm dispatcher to ensure that information is passed to the nearest law enforcement agency. Each regional cluster comprises servers as are known in the art, for example, UNIX™, which are preferred due to their dependability and capabilities of the servers. Other servers that would work include Windows NT™ servers (4.0 and later) and Microsoft NT™ servers once the 1995 innovation of a PC bus design with Intel capabilities is implemented.

The function of the server is to process hits on the system and route them to the nearest available hub. There may be one server for an estimated one million people. The hub would be one location where the security firm receives information on hits to the system and dispatches authorities. Because routing is almost instantaneous, with the individual server can process an estimated two thousand hits simultaneously and the system is a closed system based on dedicated 800 numbers, a hit received in the farthest northeastern corner of the United States, for example, could have local authorities dispatched in less than thirty seconds by a hub on the west coast of the United States. Preferably, a state of the art computer, such as a DUAL PENTIUM PRO™ having at least a nine gigabyte hard drive, is at the centrally located hub. In the preferred system, the information in the system is passed via dedicated 800 numbers and/or satellite communication networks 58.

Not only does the security card system of the invention have utility in its activation of an emergency system when the card is used, but it also is a practical, cost-effective system, as the major parties likely to be affected or which are now part of the credit-card system will all benefit. The system will allow credit card companies to sell more cards as consumers are less afraid of fraud and theft, and the system of the invention can be made with known technology for card making (e.g., the same magnetic strip or smart chip technology). CPU manufacturers will sell more CPUs for use in ATMs and at business sites, and for use by the security firm in its network of sites. The cost to a merchant to be part of the system of the invention is approximately $100–$200 at current prices, based on x86 chip technology (meaning times 86) with a modem capable of transmitting a minimum of 28,800/56,000 BPS via a dedicated 800 number. Telephone service providers will sell more "air time". Most importantly, the credit card companies (e.g., MasterCard, Visa, Discover, etc.) will save millions of dollars because of the reduction of fraudulent transactions, the public will save money because the financial institutions will not have to pass on the cost of the fraudulent transactions, and the small and large retailers can eliminate the headache of processing fraudulent transactions and having to try to collect from the card-owner. The POS/ATM CPU will not allow the sale to take place whether the merchant is on or off-line because the CPU acts as a gatekeeper to the financial institution's host. When an ATM site or POS (such as a small store) is connected to the security firm's system, it has the advantage of "prescreening" of the card. This means that if the card is not a true credit card, the CPU will not allow the transaction to take place, thereby eliminating the hassle of trying to collect on a fraudulent transaction. While it is true that this system only works for a security card with the trigger code and that stolen credit cards that have not been reported as such will be able to make transactions, the retailer will benefit by warding off potential frauds by the fact that the retailer could be a member of the security system, whether they are an on-line site or an off-line site. Given the fact that the security card appears to be an authentic card, a thief would be less likely to run the risk of using a card that could trip the alarm and thereby far less likely to steal the card(s) in the first place.

In summary, the steps the system takes are simple. First, the card is read. If it is a security card, the CPU does not allow the transaction and performs the dummy program in the case of an ATM, or simply denies the transaction in the case of a store or shop. Essentially simultaneously, the system sends out the alarm to the security firm setting into motion the full range of services the security firm provides, provided the location is on-line. If the location is not on-line, at the minimum, the fraudulent transaction is stopped and once the transactions are uploaded (for the day, week, or other time period), the rest of the security measures can be completed, such as securing other credit cards of the owner of the security card that was used, until it is verified that the owner was the one trying to use the card.

Advantages of a security card having an appearance similar to a contactless card, for example, a subway card, include that someone who steals a purse or wallet containing numerous cards, and uses the stolen contactless security card, for example, to board a subway in making a getaway, will trigger the alarm mechanisms of using the security card, thereby suspending all of the owner's "real" credit cards, and by virtue of the security firm's notification that the cards are stolen, they too will be placed on a hot list that will alert merchants that they are stolen. By using the security card in the form of a subway pass, the thief has increased his chances of being caught by several fold, and the stolen cards will never have fraudulent charges accumulated.

Consumers who benefit from the security card of the invention include any persons who are interested in protecting their financial holdings, likely at a cost which could be less than $5.00 per year, children whose parents want them to be able to call for help from anywhere there is a card reader, anyone who has a PIN or combination or any other number they want to have available but kept from being known to thieves, anyone afraid of losing their wallet, purse or credit cards, anyone who is a possible kidnapping victim, and anyone who would feel more secure knowing that the police are just a scan away.

While the invention has been described with reference to specific embodiments, it will be appreciated that numerous variations, modifications, and embodiments are possible, and accordingly , all such variations, modifications, and embodiments are to be regarded as being within the spirit and scope of the invention.

What is claimed is:

1. A security card for issuance to an owner, comprising a flat plastic card that is substantially similar in appearance and surface information content to a real bank card, so that an uninformed user of the security card cannot discern that the security card is not a real bank card, said security card being readable by a card machine but not usable to obtain money or credit when read by a card machine; wherein when the security card is read by a card machine, an invisible alarm system is initiated, and a visible dummy program is displayed that is similar in appearance to a program displayed when a real bank card is read by the card machine.

2. The security card according to claim 1, wherein the appearance of the security card includes indicia for a credit card company logo, a series of 4-digit numbers, a user name, an expiration date, and a visible area indicating where encoded information is on the card.

3. The security card according to claim 2, wherein at least one of the 4-digit numbers is a personal identification number for a real credit card owned by the owner.

4. The security card according to claim 1, wherein the invisible alarm system comprises a mechanism for activating a remote alarm and subsequent response and apprehension procedures.

5. The security card according to claim 1, wherein the invisible alarm system comprises determination by a security hub of the identity of the owner.

6. The security card according to claim 1, wherein the dummy program has a built-in time delay.

7. The security card according to claim 1, wherein the bank card is selected from the group consisting of credit cards, debit cards, student identification cards, and contactless cards.

8. The security card according to claim 1, wherein the bank card is any card that is usable in card reader or scanner.

9. A security card system, comprising:
(a) a security card for issuance to an owner that is substantially similar in appearance and surface information content to a real bank card, so that an uninformed user of the security card cannot discern that the security card is not a real bank card, said security card being readable by a card machine but not usable to obtain money or credit when read by a card machine; wherein when the security card is used in a card machine, an invisible alarm system is initiated, and a visible dummy program is displayed that is similar in appearance to a program displayed when a real bank card is read by the card machine; and
(b) a security firm that enrolls owners who have been issued a security card, responds to a remote alarm resulting from any use of the security card in a card machine, and implements subsequent response and apprehension procedures.

10. A method of reducing bank card fraud, comprising:
(a) providing a security card for issuance to an owner that is substantially similar in appearance and surface information content to a real bank card, so that an uninformed user of the security card cannot discern that the security card is not a real bank card, said security card being readable by a card machine but not usable to obtain money or credit when read by a card machine; wherein when the security card is read by a card machine, an invisible alarm system is initiated and a visible dummy program is displayed that is similar in appearance to a program displayed when a real bank card is read by the card machine are initiated; and
(b) providing a security firm that enrolls owners who have been issued a security card, responds to a remote alarm resulting from any use of the security card in a card machine, and implements subsequent response and apprehension procedures.

11. The method of claim 10, wherein the security firm response to the alarm further comprises contacting financial institutions, which have issued bank cards to the owner, to suspend use of the bank cards.

* * * * *